No. 858,384. PATENTED JULY 2, 1907.
E. HAEFELY.
MANUFACTURE OF INSULATING TUBES.
APPLICATION FILED SEPT. 6, 1904.
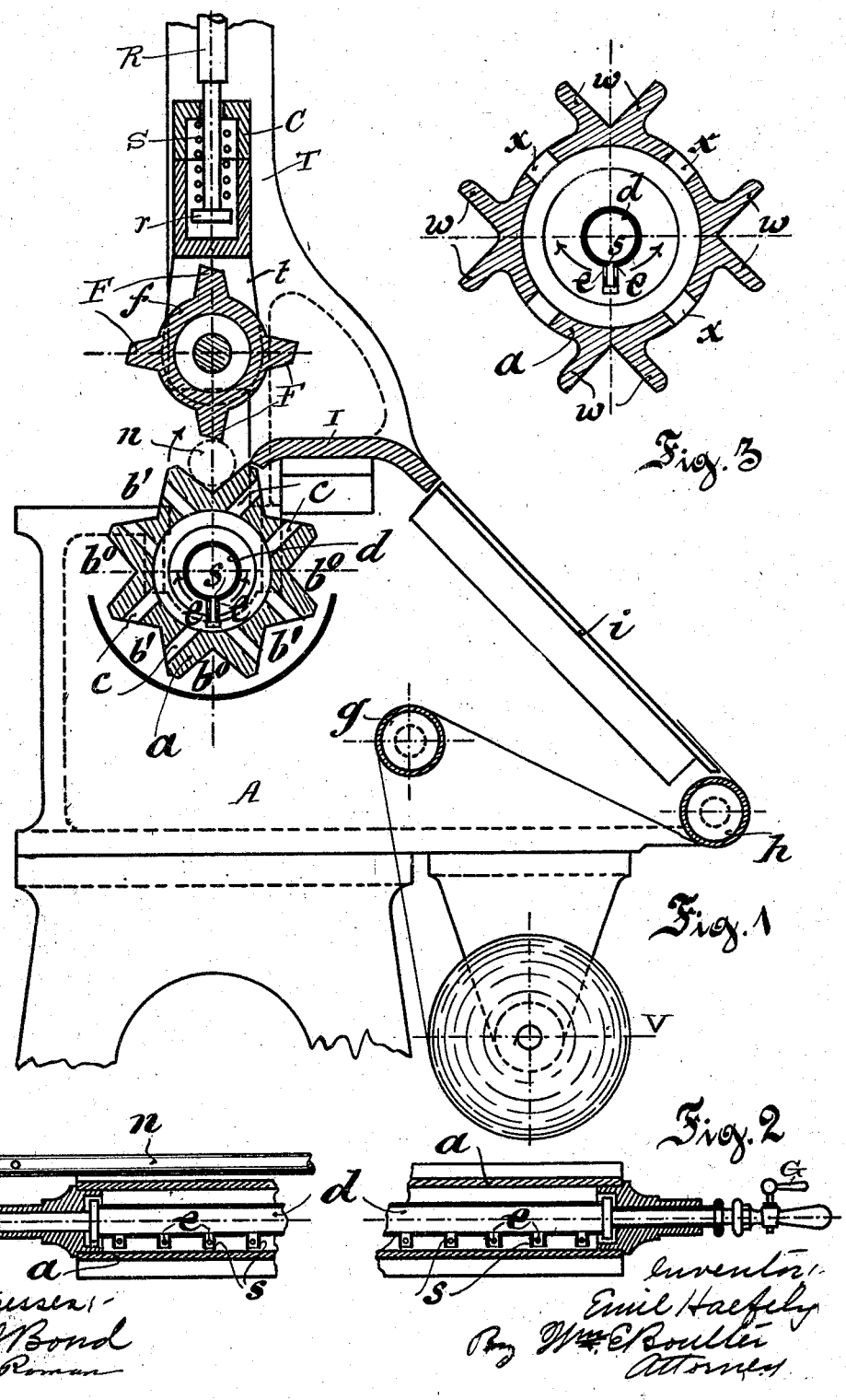

UNITED STATES PATENT OFFICE.

EMIL HAEFELY, OF BASEL, SWITZERLAND, ASSIGNOR TO WESTINGHOUSE ELECTRIC & MANUFACTURING COMPANY, A CORPORATION OF PENNSYLVANIA.

MANUFACTURE OF INSULATING-TUBES.

No. 858,384.  Specification of Letters Patent.  Patented July 2, 1907.

Application filed September 6, 1904. Serial No. 223,442.

*To all whom it may concern:*

Be it known that I, EMIL HAEFELY, a citizen of the Republic of Switzerland, residing at Basel, in Switzerland, have invented certain new and useful Improvements in the Manufacture of Insulating-Tubes, of which the following is a specification.

My invention relates to the manufacture of insulating tubes and more particularly to machines for manufacturing insulating tubes of comparatively small diameters.

The object of my invention is to provide means which shall be simple and compact in construction and durable and efficient in operation and a method by which insulating tubes may be produced which shall have important qualities and characteristics not heretofore pertaining to tubes manufactured by other means and other methods.

The apparatus devised and utilized by me for manufacturing insulating tubes comprises a heated mandrel holder having a longitudinal recess of angular cross section and a pressure device, the axis of which is parallel to that of the mandrel holder and one side or edge of which rests upon the material of which the tube is formed in such manner that a constant and uniform pressure is exerted upon such material during the winding operation.

In the accompanying drawing, Figure 1 is a view partially in side elevation and partially in section of the principal portions of a machine constructed in accordance with my invention. Fig. 2 is a longitudinal section of a mandrel holder and means for heating the same, a portion being broken away to indicate that the said parts may be of greater length than is here shown. Fig. 3 is a cross sectional view of modified form of mandrel holder.

Mounted in a suitable frame A is a mandrel holder $a$ the ends of which are closed and the length of which is approximately the same as the maximum length of tube which it is desired to produce. As here shown, the surface of the mandrel holder $a$ is provided with eight longitudinal recesses which are of angular or substantially V-shape in cross section and which extend the entire length of the holder, parallel to the axis thereof and are designated by the letters $b^0$ and $b'$, the recesses $b^0$ being of the same shape and dimensions as the recess $b'$ but alternating in position therewith. The interior of the mandrel holder $a$ communicates with the exterior by means of passages $c$ which are uniformly spaced and the outer ends of which terminate in the recesses $b'$.

A gas pipe $d$ extends through the interior of the mandrel holder $a$ and is supported in the ends thereof, suitable connections being made between one end of the pipe and a supply hose as indicated in Fig. 2. The under side of the gas pipe $d$ is provided with a series of uniformly spaced branch tubes $s$ which are closed at their outer ends and are provided with lateral openings $e$.

Above the mandrel holder $a$ is located a pressure device $f$ which is here shown as provided with a plurality of longitudinal ribs F, the edges of which are slightly chamfered or beveled for a reason which will be hereinafter more fully set forth. The pressure device $f$ is supported by a cross bar $t$ which is free to move vertically in guides provided in the standards T of the frame A, any suitable gearing or other means being provided for raising the said cross bar when the pressure device is not in use. In order that the pressure device $f$ may exert a constant and uniform pressure upon the work and in order that it may be brought into engagement and separated from the work without sudden shock, I provide a lost motion connection between it and the raising and lowering mechanism, such mechanism being here indicated by a rod R, the lower end of which projects into a chamber C with which the cross bar $t$ is provided. A coil-spring S is located in the chamber C so that its upper end may engage the upper side of the chamber and its lower end may engage a head $r$ on the lower end of the rod R.

The paper or other fabric which constitutes one of the principal elements of my product is supported in the form of a roll in suitable bearings in the frame A, as indicated at V and the paper drawn therefrom passes over a tension roller $g$, a guide roller $h$ and a table $i$ to a mandrel $n$ of the proper size which rests in the upper recess $b^0$ of the mandrel holder.

When using the machine above described in accordance with my invention, the gas cock G in the hose connection to the gas pipe $d$ is opened and the gas which escapes through the openings $e$ in the branch pipes $s$ is lighted. The air required for supporting combustion is admitted through the passages $c$, the outer ends of which are at the lower side of the mandrel holder $a$ and the products of combustion escape through the passages $c$, the outer ends of which are at the upper side of the mandrel holder, the heat generated within the mandrel holder being thus imparted with substantial uniformity to the outer or shell portion throughout its periphery and length. The products of combustion which issue from the upper right hand passages $c$ serve to heat the frame portion I which is interposed between the inclined table $i$ and the mandrel $n$ so that the material fed to the mandrel may be heated to a desired temperature before reaching the mandrel.

As the paper or other fabric is drawn from the roll V over the table $i$ it is provided with a coating of varnish or other suitable binder and the free end is wound close around the mandrel either in the position in which the mandrel is shown or, more conveniently, at the left of the pressure device as indicated in Fig. 1, after which the mandrel is returned to the position indicated and is rotated at the speed desired, either mechanically or by hand, in a clockwise direction so as to apply the fabric with the varnish coating between successive layers. As soon as the single layer of material is wound upon the mandrel and the latter is placed in the recess $b^0$ the pressure device $f$ is lowered until the entire weight of it and the bar $t$ rests upon the material on the mandrel. Inasmuch as the recess $b^0$ is of angular or V-shape in cross section and the pressure exerted from above is uniform and constant, the progressively increasing diameter of the tube, as it is formed, does not effect any variation in the degree of density of the material.
While the device manufactured by my machine may consist solely of paper or other suitable fabric and varnish, I prefer to combine mica therewith and, when so combined, thin sheets of mica are placed upon the coating of varnish as it passes to the mandrel.
Inasmuch as the varnish is heated to a comparatively high temperature in passing over the heated portion I of the frame, all volatile constituents are driven off, leaving a layer of uniform consistency and without air bubbles or other particles which might serve to impair the quality of the insulating tube when completed. On account of the continuously applied uniform pressure, no varnish in excess of the amount required as a binder can remain upon the fabric as it is wound upon the mandrel and a tube of absolute uniformity as to consistency and dimensions and having extraordinary insulating qualities and durability is therefore produced.

In the modification shown in the Fig. 3 the mandrel holder $a'$ is provided with a plurality of angularly disposed ribs $w$ which form between them the angular recesses $b^0$, like those shown in Fig. 1. For the purpose of supplying the necessary air to promote combustion and in order to permit of the escape of the products of combustion, openings or passages $x$ are provided at regular intervals between the ribs $w$.

It will be understood from the illustration and the foregoing description that only one of the angular recesses $b^0$ is utilized for the reception of a mandrel at any one time and that the form of the mandrel holder may be varied within wide limits without departing from my invention so long as it is provided with an angular longitudinal recess for the reception of mandrels of different diameters and also with suitable means for applying the necessary heat, whether such means be gas flames, as indicated, or electricity or steam. It is to be understood, however, that whether the mandrel holder be of general cylindrical contour and whether it be provided with one or several longitudinal angular recesses, it should be so formed as to present material of substantially uniform thickness throughout its periphery and length in order that it may not be warped by the application of heat. I have learned from practical experience, extending over a long period of time, that in order to obtain a product that shall be uniform in dimensions as well as in density, the mandrel holder must be of substantially uniform contour so as to avoid the distortion which is otherwise produced by the heat.

While I have shown the pressure device $f$ as having a plurality of pressure ribs F, it will be understood that only one such rib is in service at any one time and that the number of such ribs is therefore immaterial, unless they are of different thickness. The shape of the outer edge of the rib here indicated is not absolutely essential but in order to secure the desired application of pressure and avoid any possible injury to the material as it is moved beneath and in contact with the rib surface, it is desirable that the edge toward which the material moves shall be cut away in some manner and the shape here shown is perhaps more practical than any other, since it not only permits the free passage of the material without danger of injury but it is also easily and cheaply formed and insures the application of pressure substantially along a single line, thus providing three lines of pressure approximately 120° apart, which I have found best adapted for this work.

The details of construction may be otherwise modified or added to without departing from my invention and I therefore desire to include within the scope of my claims all variations and modifications which are not excluded by the prior art.

I claim as my invention:

1. A machine for manufacturing insulating tubes comprising a mandrel holder provided with a longitudinal groove of angular cross section to receive a mandrel upon which a coated fabric is wound, a pressure device located above said mandrel and supported upon the outer layer of fabric during the winding operation.

2. A machine for manufacturing insulating tubes comprising a mandrel, a longitudinally recessed mandrel holder, a pressure device that rests upon the material wound upon said mandrel and means for heating the material as it passes to said mandrel and is wound thereon.

3. A machine for manufacturing insulating tubes comprising a mandrel, a mandrel holder having a longitudinal recess in which the mandrel is rotated, a pressure device that is supported upon the layer of material wound upon the drum, and means for heating the material during the winding operation.

4. A machine for manufacturing insulating tubes comprising a mandrel upon which coated fabric is wound, a mandrel holder having a longitudinal recess of angular cross section in which the mandrel is rotated, a pressure device located above the mandrel and resting upon the tube during the winding operation and means for heating the material as it is wound.

5. In a machine for manufacturing tubes, the combination with a mandrel and a holder having a longitudinal recess to receive the mandrel, of means for feeding a sheet of fabric to the mandrel and a pressure device which exerts a constant and downward pressure upon the material on said mandrel and means for heating the material as it passes to and is wound upon said mandrel.

6. In a machine for manufacturing tubes, the combination with a rotatable mandrel and a mandrel holder having a longitudinal angular recess to receive the mandrel, of means for feeding sheet material to said mandrel and a vertically adjustable pressure device that engages the surface of the material as it is wound upon the mandrel and the weight of which is entirely supported by such material, and means for heating the material as it passes to and is wound upon the mandrel.

7. In a machine for manufacturing tubes, the combination with a cylindrical mandrel and a hollow mandrel holder having lateral passages leading from its interior to its exterior and having a heating device located therein, of means for feeding sheet fabric to the mandrel and a pressure device that exerts a constant and uniform downward pressure upon the tube as it is formed upon the mandrel.

8. In a machine for manufacturing tubes, the combination with a frame, a mandrel holder having a longitudinal recess of angular cross section and having internal heating means, of a mandrel adapted to rest in said recess, means for feeding sheet material to said mandrel to be wound around the same and a pressure device which exerts a downward, uniform and constant pressure upon the tube during its formation.

9. In a machine for manufacturing tubes from sheet material, the combination with a frame and a hollow, internally heated mandrel holder supported therein, of a mandrel adapted to receive the sheet material to form the tube and to rest upon said mandrel holder, of a pressure device which rests upon the material as it is wound upon the mandrel and exerts a constant and uniform pressure thereon.

10. In a machine for manufacturing tubes, the combination with a frame and a hollow, internally heated mandrel holder, having a plurality of angular, longitudinal recesses in its outer surface and lateral passages between its interior and some of the external recesses, of a cylindrical mandrel adapted to be received in one of said recesses, means for feeding sheet material to said mandrel to be wound thereon and a pressure device which exerts a downward, constant and uniform pressure upon the material as it is wound upon the mandrel.

11. In a machine for manufacturing tubes from sheet material, the combination with a mandrel and a mandrel holder, and means for heating the same, the material of the holder being so disposed as to be uniformly heated, of means for feeding sheet material to the mandrel and a pressure device which exerts a constant and uniform downward pressure upon the material as it is wound upon the mandrel and along a single line of contact.

12. In a machine for manufacturing tubes from sheet material, the combination with a mandrel, a hollow mandrel holder having a plurality of longitudinal angular recesses and internal heating means, of means for feeding sheet material to said mandrel to be wound thereon and a pressure device having a longitudinal rib provided with a beveled outer edge to engage the material on the mandrel as the mandrel is rotated.

13. In a machine for manufacturing tubes, the combination with a mandrel holder, a frame having a guide plate adjacent to said holder, of means for heating said mandrel holder and said guide plate, a mandrel supported by said holder adjacent to one edge of said guide plate, means for feeding sheet material to said mandrel and a pressure device that rests upon the material as it is wound upon the mandrel.

14. The combination with a hollow mandrel holder having a plurality of exterior longitudinal recesses of angular cross section and having lateral passages between the interior and some of said recesses, of a gas burner in the interior of said mandrel holder, the supporting frame of said holder having a guide plate adjacent to the holder and heated by the gas burner therein, a mandrel located in the uppermost recess in the holder, means for feeding sheet fabric to said mandrel and a pressure device that rests upon the material as it is wound upon the mandrel.

15. In a machine for manufacturing tubes, the combination with a longitudinally recessed mandrel holder and a frame in which said holder is supported, of a mandrel freely supported in the holder recess, means for feeding sheet fabric to said mandrel, a pressure device normally resting freely upon the material as it is wound upon the mandrel and means for raising the pressure device when it is desired to remove the mandrel and a tube formed thereon, said means comprising a lost motion spring connection.

16. In a machine for manufacturing tubes, the combination with a cylindrical mandrel, a mandrel holder having a longitudinal angular recess to receive said mandrel, and a frame having a guide plate adjacent to said holder, of means for heating the mandrel holder and guide plate, means for feeding the sheet material over said guide plate to said mandrel, and a pressure device the weight of which is supported by said mandrel and the material wound thereon.

In testimony whereof I have signed my name to this specification in the presence of two subscribing witnesses.

EMIL HAEFELY.

Witnesses:
GEO. GIFFORD,
ALBERT GRAEBER.